United States Patent [19]
Cameno

[11] Patent Number: 6,023,992
[45] Date of Patent: Feb. 15, 2000

[54] AUTOMATIC TENSIONING DEVICE FOR HAND BRAKE LEVERS

[75] Inventor: Alfonso Cameno, Galdakao, Spain

[73] Assignee: Batz, S. Coop. Ltda., Igorrre, Spain

[21] Appl. No.: 09/098,378

[22] Filed: Jun. 17, 1998

[30] Foreign Application Priority Data

Jun. 19, 1997 [ES] Spain ..................................... 9701337

[51] Int. Cl.[7] .................................................... F16C 1/22
[52] U.S. Cl. ..................................... 74/501.5 R; 74/502.4
[58] Field of Search ........................... 74/501.5 R, 500.5, 74/502.4, 502.6; 192/111 A

[56] References Cited

U.S. PATENT DOCUMENTS

| | | |
|---|---|---|
| 1,741,365 | 12/1929 | Heymann . |
| 5,386,887 | 2/1995 | Hilgert et al. . |
| 5,544,543 | 8/1996 | Hilgert et al. .......................... 74/502.4 |
| 5,664,461 | 9/1997 | Kitamura ....................... 74/501.5 R X |

FOREIGN PATENT DOCUMENTS

| | | |
|---|---|---|
| 0040574 | 11/1981 | European Pat. Off. . |
| 2621090 | 3/1989 | France . |
| 19618422 | 5/1997 | Germany . |
| 1-131014 | 9/1989 | Japan ..................................... 74/502.6 |
| 2176861 | 1/1987 | United Kingdom ............... 192/111 A |
| 9527642 | 10/1995 | WIPO . |

*Primary Examiner*—Mary Ann Battista
*Attorney, Agent, or Firm*—Browdy and Neimark

[57] ABSTRACT

An automatic tensioning device for hand brake levers, with an enclosed casing (9) and rectangularly hollow in its interior, which is situated on the lever or on its support base. The interior of the casing is hollow, with one of its ends being tapered at the sides (24), and receives a square-shaped slide (1) with toothed sides (2) inside this hollow. This slide combines with two other attached parts (13, 14) that are toothed on the corresponding sides and that have wedge-shaped ends (23). These attached parts (13, 14) are forced by a spring against the narrowing taper of the casing, and the front end (4) of the slide is secured to the brake cables.

9 Claims, 2 Drawing Sheets

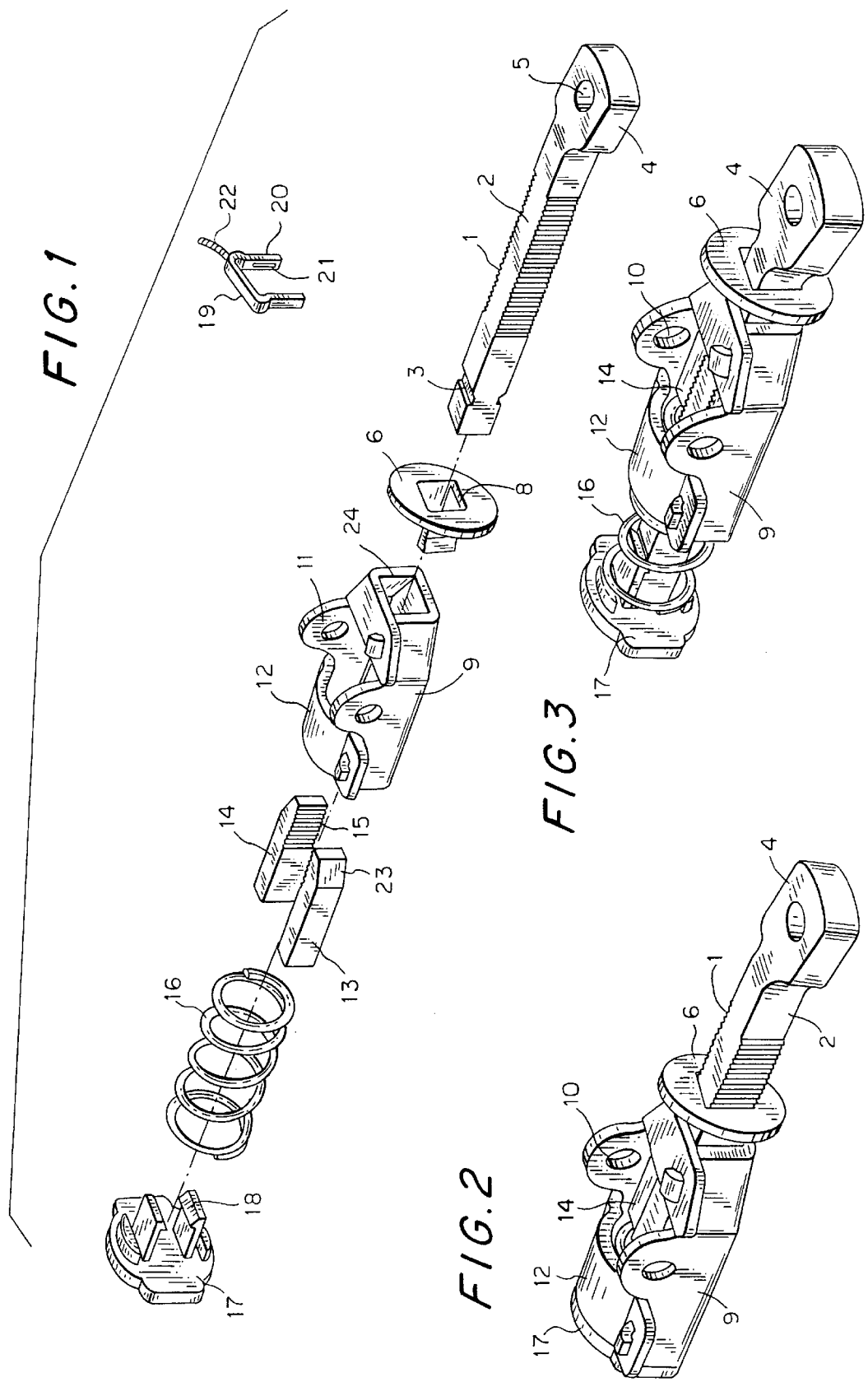

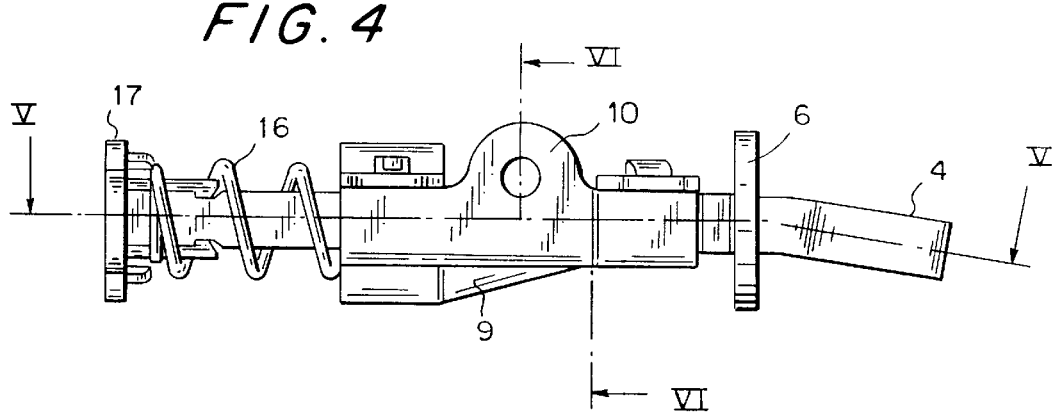
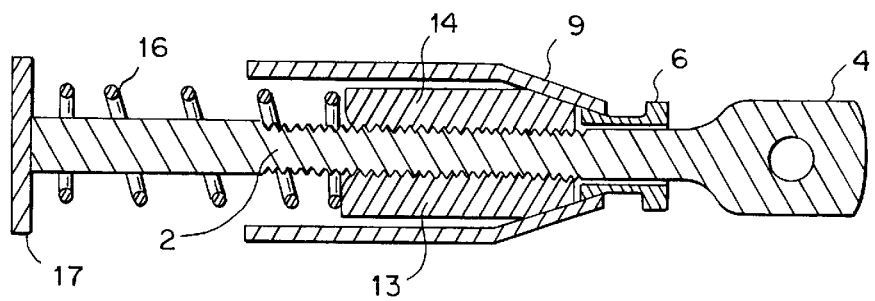
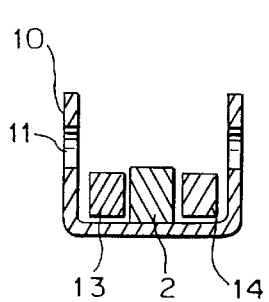
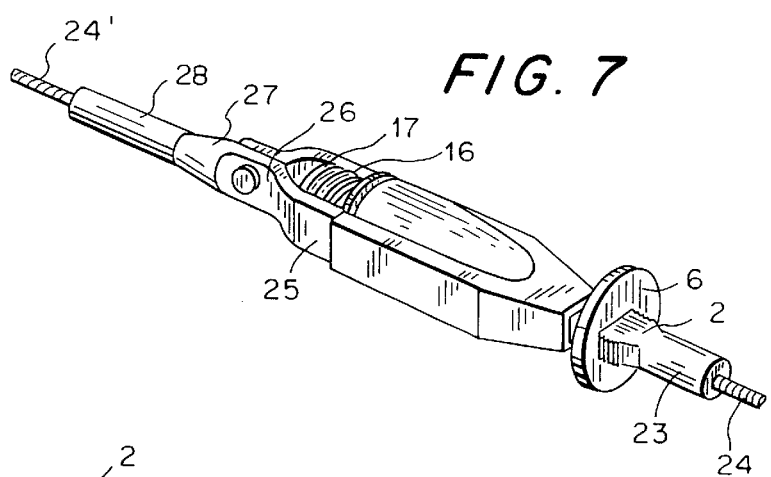
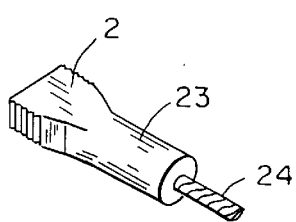

AUTOMATIC TENSIONING DEVICE FOR HAND BRAKE LEVERS

FIELD OF THE INVENTION

This invention relates to an automatic tensioning device for the hand brake levers of automobile vehicles, whose purpose is to keep the brake cable properly tensioned. These cables go from the position of the said lever to the barking elements, the brake shoes of the vehicle wheels. In the same way, its application in other techniques that require a cable to be kept under tension is not discarded.

REVIEW OF RELATED TECHNOLOGY

In devices of this type existing on the market, solutions aimed at this purpose are given, although these are not satisfactory, due especially to their complexity and to their lack of sturdiness, which makes their assembly laborious and their working life relatively short.

Among these solutions, a device is known through patent US. A. 1,741,365, in which a brake mechanism based on levers uses a central part with toothed sides, to which another two toothed parts forced by springs are fitted, allowing the movement of the central part in one single direction when so requested externally.

Along these same lines, the EP. A. 0040574 also uses a toothed central part in association with tow other toothed side parts. In this mechanism these two side parts have chamfers that rest on the inclined surfaces of a front part, with these side pieces in turn being forced by a spring that surrounds the central part and butts up against a rear cover fixed to this central part.

OBJECTS AND SUMMARY OF THE INVENTION

One object is to provide an automatic tensioning device for hand brake levers that is extraordinarlly simple.

Another object of the invention is an automatic tensioning device for hand brake levers that provides a very sturdy system with a long working life.

Another object of the invention is an automatic tensioning device for hand brake levers that offers very easy assembly and versatility, as it can be positioned in different locations in the system.

In order to implement these objectives, the device in the invention claims a longitudinal casing or frame which is hollow inside and has a rectangular shape, that has one open end and has its other end tapered by having converging side walls of the cross section, and is also open towards the exterior. Obviously, the first opening has a bigger cross section than the second.

Running through the axial centre of this casing is a part by way of a slide, which has a square transversal cross section and is provided with vertically-cut teeth on its sides, at the end corresponding to the tapered part of the casing.

The cross section of this slide is such that it is able to pass through the gap in the converging end of the casing.

The end of the slide, at the end corresponding to the wider part of the casing, is provided with a set of notches cut into two of its parallel sides, and the end is provided with means to receive the tension cables that are connected to the brake shoes.

The portion of the slide that is provided with these notches is surrounded by a spring that becomes housed inside the casing and controlled by a rear cover that closes off the open end of the said casing. This cover is provided with two lugs that project inwards, whose ends have ridges that are capable of fitting into the notches in the slide, so that this cover, apart from closing off the end of the casing, acts as a support for the spring that surrounds the slide. The inside of the casing is also occupied by another two longitudinal parts with a square cross section that are located at the sides of the slide, with these side pieces having vertically-cut teeth on their sides towards the slide, that correspond with those on the said slide.

The ends of these two longitudinal parts are wedge-shaped along the sides of their outer ends, through which they adapt to the converging inner sides of the casing.

As these two longitudinal parts are shorter than the slide, the end of the internal spring is supported on their rear sides, with which the spring puts pressure on the two parts, pushing them towards the converging end of the casing.

In the same way, the open converging end of this casing also receives another cover provided with a square central hole, through which the slide passes. The inner side of this cover is provided with projections that also pass through the opening in the casing and provide frontal support for the two previously mentioned longitudinal parts and, at the same time, are used to unlock these in resetting the mechanism to zero, as will be explained later.

With the device prepared in this way, a U-shaped fork is situated in front of this cover, with its wings or sides provided with vertical facing ledges capable of being housed between the teeth of the protruding portion of the slide, thus fixing the latter in the initial pretensioning position of the unit.

The protruding forward end of the slide can be connected directly to the tensioning cable through a hole in the said end, which is usually inclined in relation to the rest of the slide.

The protruding forward end of the slide can also be connected to a balance lever, from which the cables leave that go to the brake shoes.

The unit of the device can be assembled on the hand brake base or support, by means of a pin that passes through a set of lugs with holes that form part of the casing itself.

The unit can also be assembled on a rod or cable protruding from the hand brake lever itself based on a prolongation that starts from the casing in the position of the cover that controls the internal spring.

By extension, the unit of the device can be assembled on any cable, rod or tension member that is capable of being regulated.

The operation of the automatic tensioning device, once it has been situated in the place required, begins with the setting of the tensioning of the cable by using the fork in order to carry out this setting.

The fork is connected by any known or conventional means to the hand brake lever in such a way that when the lever is initially operated, the fork is extracted from its pretensioning position.

As the different operations of using the hand brake lever take place, the tension of the cable decreases, causing the internal spring inside the casing, that acts against the rear cover, to come into action. As this is connected to the slide, traction takes place on the slide, overcoming the inter-relation between its notches and those of the two adjacent longitudinal parts, with which the cable becomes tensioned once again.

To operate the device in the opposite way, for instance for pretensioning, it is necessary to operate the forward cover, whose lugs are facing the two longitudinal parts, by pressing on these lugs, which become released from their recesses in the converging side walls of the casing.

BRIEF DESCRIPTION OF THE DRAWING FIGURES

All these and other details of the invention will be understood with greater clarity by referring to the accompanying sheets of drawings, in which the following are represented, for guidance purposes only:

FIG. 1 is a perspective view that shows the device of the invention divided into its constituent parts.

FIG. 2 is a perspective view of the device of the invention in its assembled position, with the cover connected to the larger open end of the casing.

FIG. 3 shows a working position of the device of the invention in a perspective view.

FIG. 4 is a side elevation of FIG. 3.

FIG. 5 corresponds to the view resulting from the cross section along 2—2 in FIG. 4

FIG. 6 corresponds to the view resulting from the cross section along VI—VI in FIG. 4

FIG. 7 is a construction variant of the unit of the device, in accordance with the invention.

FIG. 8 shows the forward part of the slide in greater clarity, in accordance with FIG. 7.

DETAILED DESCRIPTION OF THE PREFERRED EMBODIMENTS

Looking now at FIG. 1, we can appreciate the casing or frame (9), open at its rear end (12) and with its forward end (24) with converging side walls also open. The casing (9) has its lugs (11), holed and facing each other, capable of receiving a pin or shaft for it to be fitted onto the hand brake lever base or support.

At the rear part, we can appreciate the cover (17) with its lugs (18) as well as the spring (16) that goes round the slide (2) and is supported on the cover (17) and on the rear sides of the two longitudinal parts (13, 14).

The lugs (18) finish off in ridges that are received in the two notches (3) in the slide (2), thus fixing the mutual position of both parts, and the two longitudinal parts (13, 14) have the teeth (15) cut in their facing sides, as well as the outer chamfers (23) for them to adapt to the converging side walls of the casing (9).

We can also observe the slide (2) with its teeth (1) that correspond to the teeth (15) of the two longitudinal parts (13, 14), the notches (3) and the forward end (4) provided with the hole (5) in order to connect the cable for tensioning.

The forward cover (6) that closes off the forward end (24) of the casing (9) has a central hole (8) through which the slide (2) passes, as do the rear lugs, not numbered, that become housed in the casing (9) as will be appreciated later.

Above the slide (2), the U-shaped fork (19) can be seen, with its wings (20) provided with vertical facing ledges (21) responsible for becoming housed between the teeth (1) of the said slide in order to set the zero resetting position of the unit. This fork is situated in front of the forwards cover (6) in this operation, and has a prolongation (22) that is connected to the hand brake lever, so that when the hand brake lever begins its successive operations, the fork can be removed without being lost and with the possibility of being reusable.

As shown in FIG. 2, the fork is already removed and the device is assembled, pretensioned and prepared to carry out its function of automatically regulating the tension of the cable that goes from the end (4) of the slide towards the brake shoes of the wheels. In the same FIG. 2 we can also see the facing holes (10) in the lugs on the casing (9), with the slide (2) housed inside the casing, as well as the occupation of the said casing by the longitudinal parts (13, 14).

According to FIG. 3, the slide (2) has gradually entered into the interior of the casing, overcoming the resistance of the spring (16) and the rear cover (17), so that when it moves against the position of the cable, this becomes tensioned. This position is complemented by the one shown in FIG. 4, which makes it possible to appreciate, in conjunction with FIG. 3, the exact positions of the different constituent parts.

The inclination of the end or head (4) of the slide (2) is advisable when a balance lever is used, with two tensioning cables being connected to this balance lever, for example, so that the theoretical longitudinal prolongation of this end (4) passes through the centre of the holes (10) in the lugs (11) on the casing (9) in order to avoid maladjustment in assembly.

FIGS. 5 and 6 allow us to observe the entry of the two longitudinal parts (13, 14) to the base of the forwards converging area of the casing (9), duly obliged by the spring (16) and putting pressure on the slide (2) by the engagement of the respective teeth.

We can also appreciate the position of the forward cover (6) with its lugs making contact with the forward ends of the two longitudinal parts (13, 14). Acting on the cover (6) makes it possible to unlock the sad two parts in order to set the device to zero.

FIG. 7 shows the construction variant, according to which the device is mounted on a cable or rod (24') that protrudes from the hand brake lever. In this case, the casing or frame is modified at the rear portion (25, 26, 27, 28) in order to connect it to the said cable or rod (24'), all with the forward portion determined by the formation (23) connected to the cable (24) at the forward end of the slide (2), which is shown enlarged in FIG. 8.

It is important to point out, once having described the nature and advantages of this invention, its non-restrictive character, inasmuch as changes in the shape, materials or dimensions of its constituent parts will not in any way alter its essence, as long as they do not mean a substantial variation of the whole assembly.

I claim:

1. An automatic tensioning device for a hand brake lever connected to a cable, the cable in turn connected to brake shoes of vehicle wheels; the tensioning device comprising:
   a central part (1) comprising a square-shaped slide (2) including sides comprising first vertical teeth;
   two longitudinal parts (13, 14) adjacent to the slide, the longitudinal parts including a square cross section and comprising second vertical teeth corresponding with the first vertical teeth of the central part and positioned opposite thereto, the two longitudinal parts including wedge-shaped ends (23) and opposing rear ends;
   a spring (16) acting on the opposing rear ends;
   a casing (9) wherein the central part and the longitudinal parts (13, 14) are fitted, the casing comprising a central hole or gap through which the central part passes, the casing comprising converging inclined inner sides or walls (24) supporting the wedge-shaped ends of the longitudinal parts (13, 14);
   an interior of the casing (9) being hollow and comprising an approximately rectangular cross section, a rear end of the casing being open;

a rear cover (17) closing off the open rear end of the casing and acting as a stop for the spring (16);

the central part (1) being provided with a forward end (4), adapted to be connected to the cable of the brake shoes, and a rear end; the rear end including notches (3) engaging rear-cover lugs (18) of the rear cover (17);

a forward cover (6) comprising a square hole (8) through which the central part the slide of the central part passes, the forward cover being received by a forward casing end of the casing and comprising on a side thereof towards the casing a set of forward-cover lugs (7) housed in the interior of the casing, the forward-cover lugs acting as a front support for the two longitudinal parts (13, 14) in order to unlock these when setting the device to zero; and a U-shaped fork (19), situated in front of the forward cover (6), comprising wings (20) provided with vertical facing ledges (21) engaging the first vertical teeth of the slide (1), whereby an initial pretensioning position of the device can be set.

2. The device according to claim 1, comprising a balance lever connected to the forward end (4) of the slide, the balance lever adapted to be connected to the cable.

3. The device according to claim 1, wherein the forward end (4) of the central part (1) is adapted to be connected directly to the cable and is provided with an angular inclination in relation to a remainder of the central part.

4. The device according to claim 1, wherein the casing (9) is adapted to be mounted on the hand brake lever.

5. The device according to claim 1, wherein the device is adapted to be mounted on a base or support of the hand brake lever by a pin or shaft that passes through holed lugs (10) on the casing (9).

6. The device according to claim 1, comprising a cable/rod (24') adapted to be coupled to the hand brake lever, the cable/rod being based on a prolongation that protrudes from the casing (9).

7. The device according to claim 1, comprising a coupling adapted to be coupled to a tension member.

8. The device according to claim 1, wherein the casing (9) comprises metal.

9. The device according to claim 1, wherein the casing (9) comprises plastic.

* * * * *